Figure 1:
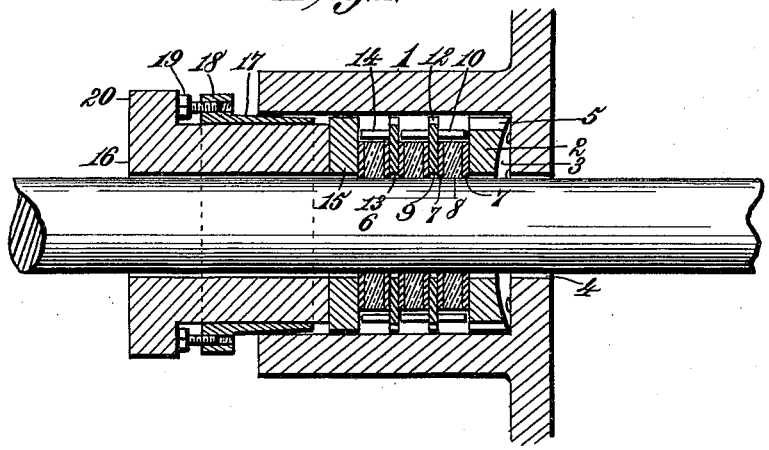

(No Model.) 2 Sheets—Sheet 1.

F. P. & J. T. MARTIN.
ROD PACKING.

No. 470,303. Patented Mar. 8, 1892.

Witnesses.
Robert Emett.
J. A. Rutherford.

Inventors.
Francis P. Martin.
John T. Martin.
By James L. Norris.
Atty.

(No Model.) 2 Sheets—Sheet 2.
F. P. & J. T. MARTIN.
ROD PACKING.
No. 470,303. Patented Mar. 8, 1892.
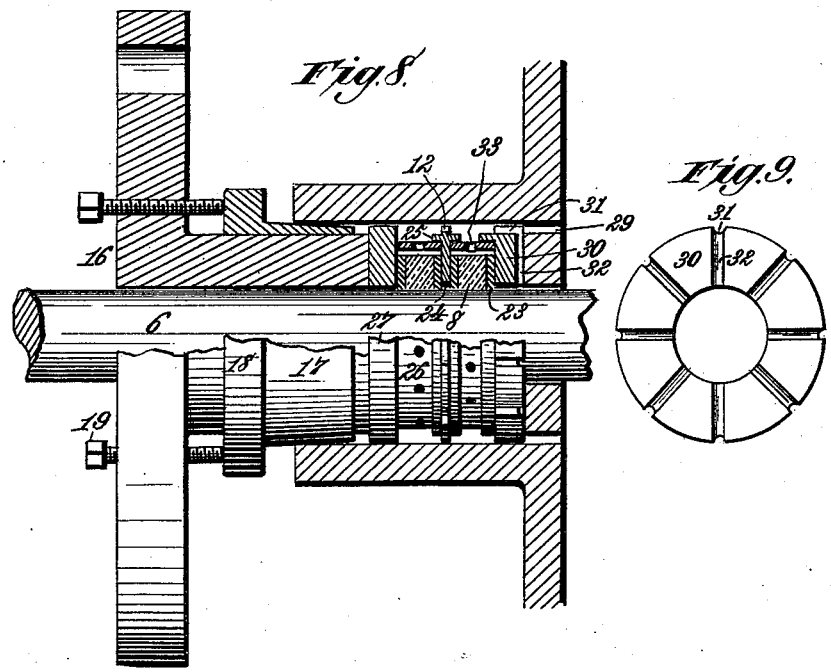
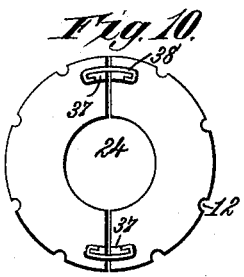
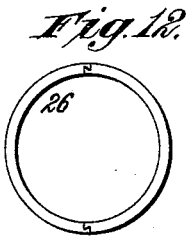
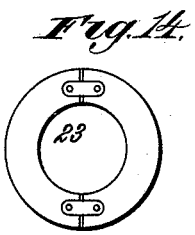
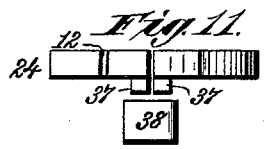
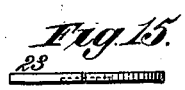
Witnesses,
Robt. Burnett
J. A. Rutherford
Inventors,
Francis P. Martin.
John T. Martin.
By James L. Norris
Atty.

UNITED STATES PATENT OFFICE.

FRANCIS P. MARTIN, OF EASTON, AND JOHN T. MARTIN, OF SCRANTON, PENNSYLVANIA.

ROD-PACKING.

SPECIFICATION forming part of Letters Patent No. 470,303, dated March 8, 1892.

Application filed November 22, 1890. Renewed August 17, 1891. Serial No. 402,830. (No model.)

*To all whom it may concern:*

Be it known that we, FRANCIS P. MARTIN, residing at Easton, in the county of Northampton, and JOHN T. MARTIN, residing at Scranton, in the county of Lackawanna, State of Pennsylvania, both citizens of the United States, have invented new and useful Improvements in Rod-Packings, of which the following is a specification.

Our invention relates to packings for rods, valve-stems, and other similar purposes; and the object thereof is to provide a steam-packing consisting of a series, comprising any number required, of similar cleft packing-rings encircling the rod, each ring lying within a separate chamber closed save as to the openings for the admission of steam behind the rings, the construction being such that the packing may be built up or extended to any suitable degree, according to the length of the stuffing-box.

It is our further purpose to combine with the cleft packing-rings and with the piston-rod or valve-stem wear-plates, which lie upon each side of the packing-rings and have an opening closely fitting the rod, whereby should there be any play of the rod the packing-rings and wear-plates will move together in contradistinction to one sliding or moving upon the other, thus avoiding any perceptible or material wear upon these parts.

It is our further purpose to provide a ring adapted to separate two adjacent ring-chambers from each other, said ring being so constructed that it will hold the separating-rings upon each side thereof at such distance therefrom as to permit the introduction of the cleft packing-rings, together with the wear-plates, if desired, and prevent said separating-rings from being crowded against the packing-rings, thereby preventing said rings from interfering with the free play of the packing-rings and from obstructing their compression and release.

It is our further purpose, also, to provide novel means whereby a steam-tight joint may be formed by the insertion of the gland within the end of the stuffing-box, and whereby, also, a delicate and accurate adjustment may be made to compensate for wear or for differences in the length of the stuffing-boxes in different engines.

It is our purpose, moreover, to provide a construction of the several parts of the packing already referred to whereby it may be applied to the rod without disconnecting the engine, which is always a difficult and tedious matter; to provide simple and novel means whereby the divided rings and other parts formed in equal halves may be connected together after being placed upon the rod, thus avoiding the necessity of disconnecting the engine and greatly economizing the time and labor required in applying the packing.

Our invention also comprises certain novel improvements in construction, whereby the steam thrown in behind the packing-rings may be taken from different points, in certain novel forms of construction for uniting the divided sections of the parts inclosing and separating the packing-rings, and, finally, in various modifications of construction and arrangement of parts, whereby the packing is adapted to modified forms of stuffing-boxes, to different means for closing the same, and to the different methods of admitting the steam which is thrown in behind the packing-rings.

The invention consists to these ends in the several novel features of construction and new combinations of parts, hereinafter fully set forth, and then definitely pointed out in the claims following this specification.

To enable others skilled in the art to make and use our said invention, we will proceed to describe the same in detail, reference being had to the accompanying drawings, in which—

Figure 2:
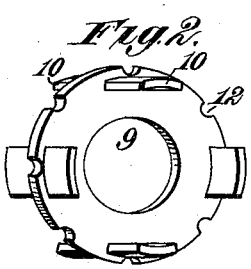
Figure 3:
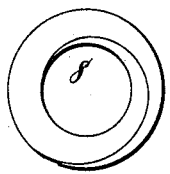
Figure 4:
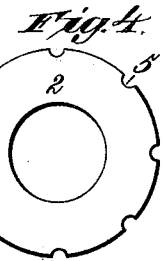
Figure 5:
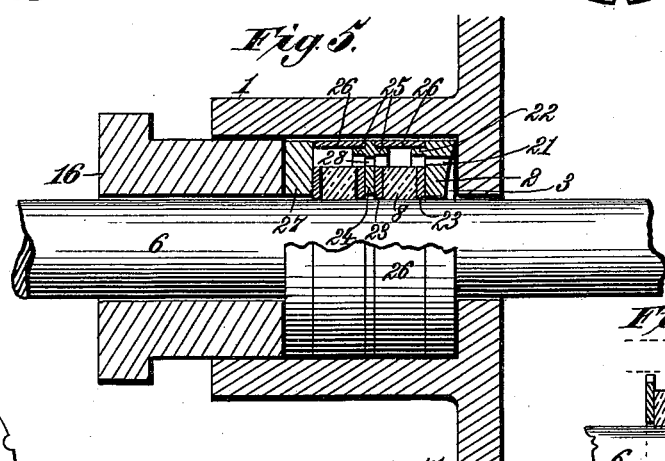
Figure 17:
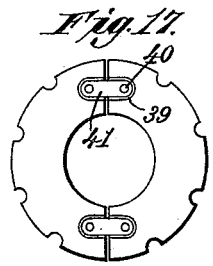
Figure 6:
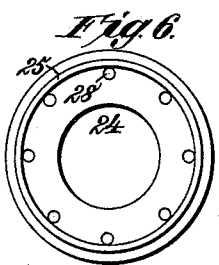
Figure 7:
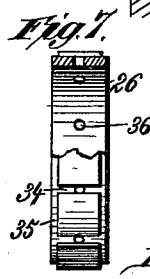
Figure 18:
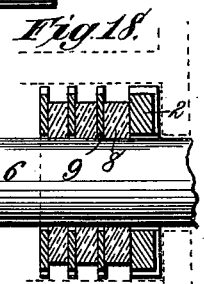

Figure 1 is a central longitudinal section of a stuffing-box provided with our invention and closed by a gland having our improvements connected with or embodied in the same. Fig. 2 is a detail perspective view of one form of separating-ring lying between the ring-chamber. Fig. 3 is a side elevation of one of the cleft packing-rings. Fig. 4 is a side elevation of one of the separating-rings, forming, in conjunction with the ring shown in Fig. 2 and with the solid ring supported by the lugs thereon, one of the separate packing-ring chambers. Fig. 5 is a diametrical longitudinal section of a gland and stuffing-box, showing a slight modification in construction and arrangement of parts. Fig. 6 is a face view of the double-flanged separating-ring shown in Fig. 5. Fig. 7 is a sectional elevation of the same. Fig. 8 is a sectional elevation, showing a modification of the form and arrangement shown in Fig. 5. Fig. 9 is a face view of the flat inner washer lying next the cylinder-head, showing the radial steam-grooves and the transverse communicating-grooves on the periphery. Fig. 10 is a face view of a split separating-ring, showing one form of construction for uniting said parts. Fig. 11 is an edge elevation of the parts shown in Fig. 10, the link being slightly separated to show the lugs on the two parts of the ring. Fig. 12 is a view of one of the divided inclosing-rings, showing the manner of uniting the parts. Fig. 13 is an edge elevation of the ring shown in Fig. 12. Fig. 14 is a face view of one of the divided washers. Fig. 15 is an edge elevation of the same. Fig. 16 is a face view of one of the divided flanged separating-plates, showing the arrangement of the lugs for uniting said parts in the line of the flange. Fig. 17 is a face view of one of the separating-rings, showing a modified construction for uniting the parts of a cleft-ring. Fig. 18 is a diametrical section showing a modified arrangement of the packing-rings and separating-plates.

In the said drawings, the reference-numeral 1 designates the stuffing-box of any ordinary cylinder, which differs from the latter only in that it may have a perfectly flat face upon the outer surface of the cylinder end inclosed by said stuffing-box. Within the stuffing-box 1 and resting upon the face of the cylinder is placed a washer 2, having a concave face adjacent to the cylinder, forming a steam-chamber 3, which receives live steam through the piston-opening 4, which passes through grooves or chambers 5, formed in the periphery of said washer to permit the unobstructed passage of the steam entering the chamber 3. This washer is mounted loosely upon the rod 6, and its periphery may have a close fit upon the inner wall of the stuffing-box to prevent the ready escape of steam at any point save through the chamber 5. Upon the rod 6 is next slipped a wear-plate 7, preferably of circular form and of less diameter than the washer 2, and lying against this wear-plate, which has a central opening surrounding the rod closely, but not with such a degree of friction as to compel it to bind upon the rod, is a cleft compressing and packing ring 8. (Shown in Fig. 3.) A second wear-plate 7 is now slipped upon the rod 6 and pushed up against or nearly against the outer side of the packing-ring 8, and against the outer face of this second wear-plate rests a separating-plate 9, having rings or lugs 10, which lie parallel with the axis of the rod, or substantially so, and have their ends abutting against the washer 2 outside the edge of the inner wear-plate 7. These rings or lugs are of such length that, while they hold the separating-plate in place, they also prevent it from being crowded against the second wear-plate in such manner as to drive said wear-plate against the packing-ring 8 with such force as to impede its adjustment. From the outer face of the separating-plate 9 extend in an opposite direction similar lugs or rings 10, having the same length, and a third wear-plate 7 being slipped on the rod and pushed up against the outer face of said separating-plate. A second packing-ring 8 is placed on the rod and pushed up against the outer face of this wear-plate, while an outer and similar wear-plate lies against the outer face of the packing-ring. The packing may be built up in this manner to any extent, according to the length of the stuffing-box, the winged separating-plates being provided with peripheral notches 12 for the passage of the steam, while their edges between these notches meet the inner face of the stuffing-box, or substantially so. The construction of these separating-plates is shown in detail in Fig. 2, from which it will be seen that, instead of the lugs or wings 10, we may use a continuous circular flange.

Referring again to Fig. 1, if it is desired to insert one packing-ring only in addition to the two described, we place upon the rod a separating-plate 13 having wings or lugs 14 similar to the wings 10, already described. These wings 14 project outwardly and a packing-ring 8, inclosed between two wear-plates 7, in the manner already described, is placed upon the rod 6, and an outer washer 15 is then slipped on the rod until its inner face rests against the ends of the wings 14. It is now necessary to close the mouth of the stuffing-box in such manner that it shall be steam-tight, and to accomplish this we have devised the following means.

The reference-numeral 16 denotes a gland of any ordinary construction save that its inner end or face is not necessarily concaved to draw the stuffing against the rod, as in the old constructions, but may be perfectly flat, and closely surrounding this gland, which is throughout of somewhat less diameter than the interior of the stuffing-box, is placed a ring or annulus 17 of copper or other suitable material, which closely fits, but is movable upon the gland. The outer face of this ring is of a very gradual taper or increasing thickness from its inner toward its outer edge, which is provided with a strong collar 18, into which are tapped bolts 19, having their heads resting against the inner face of the flange 20 upon the gland. By turning these bolts in one direction the tapered annulus 17 may be driven into the mouth of the stuffing-box with great force, forming a perfectly-tight steam-joint, which will be free from leakage, and being supported by the gland it will not collapse under any degree of pressure. If desired, the inner edge of the stuffing-box may be very slightly enlarged, flared, or beveled to prevent the sharp angle from scraping the metal of the annulus and to secure a closer fit over a more extended surface. When the packing is sufficiently built up, and the washer 15 in place, the gland is inserted until its inner end rests against the said washer. The usual fastening-bolts are connected to the ends, and the bolts are turned to drive the annulus inward between the stuffing-box and the gland until the joint is perfect.

A modification of this construction is shown in Fig. 5, wherein the inner washer 2 is similar to that shown in Fig. 1, save that steam-openings 21 are drilled in its body near the edge and communicating with the steam-chamber 3. In this construction also the washer 2 is provided with a flange 22 upon its outer face running entirely around the same at a little distance within the edge or periphery, for a purpose presently to be explained. A wear-plate 23 lies against the outer face of the washer 2, and between the said wear-plate and an outer and similar one the packing-ring is inclosed in the manner already set forth. Against this outer packing-plate rests a separating plate or ring 24, having a central opening large enough to permit some play to the rod, the edge of said ring or plate being extended to the inner wall of the stuffing-box. Upon each face of said ring is formed a circular flange 25, set back from the edge a distance equal to that of the flange 22 on the washer 2. A solid collar 26 rests upon these flanges 22 and 25, the outer diameter of said collar being substantially equal to the inner diameter of the stuffing-box, and by means of this collar the separating-ring 24 is prevented from crowding against the packing-ring. Upon the opposite or outer face of the separating-plate a similar solid ring or collar rests upon the outer flange 25, and the packing may be built up to any extent in this manner by simply inserting a separating-plate 24 with its double flange 25 between the second and third packing-rings, and so as far as desired. When the series is completed, a washer 27, similar to the washer 15 in Fig. 1, is slipped upon the rod and pushed up against the outer edge of the last or outer solid ring or collar 26, and the gland 16 is then inserted and pushed up against the washer, being fastened in the usual manner. When the collars or rings 26 lie upon the outer faces of the collars or flanges 25, the steam flowing through the drilled openings 21 will pass also through similar openings 28 in the separating ring or plate formed within the collars or flanges 25, thus being thrown against the backs or outer edges of the packing-rings. The solid collars or rings 26 may be arranged inside the flanges 22 and 25, as shown in Fig. 8, and in this case we may drill steam-openings 29 in the cylinder-head at the point where the inner face of the stuffing-box unites with the same. With this construction the periphery of the washer 30 lying against the cylinder-head will be provided with transverse notches 31, with which radial channels 32 communicate. The solid collars or rings in this arrangement are provided with steam-openings 33, drilled or punched in about a central line at suitable intervals apart, by which the steam is admitted to the ring-chambers and acts upon the packing-rings.

In cases where we may desire to employ all the interior space possible, we may use the arrangement of separating-rings and solid rings shown in Fig. 5 in connection with the stuffing-box shown in Fig. 8, wherein the steam-openings 29 are formed at the angle between the inner face of the stuffing-box and the cylinder-head. In this case, inasmuch as the outer faces of the solid rings 26 lie against the wall of the stuffing-box, they will be provided with transverse channels 34 on their outer faces, and the edge of the separating-ring 24 will be provided with notches 12, as shown at Fig. 8, to allow the passage of the steam. As the solid rings may turn, however, so that their channels 34 will not register with the notches in the separating-plate, we form circumferential channels 35 on each outer angle of the solid ring, each having communication with the channels 34, whereby steam may flow freely from any of said channels, and pass thence through the notches in the edge of the separating-ring into the corresponding channels of the ring on the other side. Perforations 36 will necessarily be formed about the center of each transverse channel 34 to provide passage for the steam into the ring-chamber.

In applying the packing thus far described to the piston-rod of a locomotive or other steam-engine, it is necessary to disconnect the engine, which is a matter involving much labor and time. To avoid this necessity we have devised a divided packing, in which all the parts, save the cleft packing-ring, are divided by a diametrical cut into two substantially equal parts. The construction we have adopted for this purpose is shown in Figs. 10 to 18, both inclusive.

Fig. 10 shows a divided separating-ring with the means for uniting the parts thereof. The latter consists of small lugs 37 lying close to the dividing-line between the two similar parts of the ring and rising somewhat from the surface of the said parts. Over these lugs a link 38 is slipped, having its body curved into substantially the same curvature as the circumference of the ring, while its ends are hooked around or turned, as shown in Fig. 10. When the link engages the lugs 37, these hooks lie in recesses in said lugs formed by cutting away the angles, so that the hooks may form flush-surfaces with the inner faces of the lugs.

In the construction of the solid rings, they are divided diametrically, as shown in Figs. 12 and 13, and united by a dovetail, as shown, or by a tongue or groove.

The divided flanged rings shown in Fig. 16 are connected by links, which engage lugs on the separate parts in the manner shown in Figs. 10 and 11, the only difference being that the circular flange is cut away slightly upon each side of the line of the division, the lugs being formed in the same line with the circular flange, in order that the surfaces shall be as nearly flush inside as possible. We may also mill out recesses 39 in the faces of the separate parts of the ring, as shown in Fig. 17. In these milled recesses are set-pins 40, with which are connected links 41, thus giving flush faces to the links and halves of the ring.

It will be seen that in the construction of the separating ring or plate shown in Fig. 16, it would be difficult to form a good steam-joint; but as we use the wear-plates already alluded to and shown in Figs. 14 and 15, we simply lay the two parts of these plates, connected by links in the manner shown, within the circular flange in such manner that their lines of division shall cross the line of division of the separating plate or ring at right angles or thereabout, and in this manner we form an excellent joint sufficiently tight for the purpose proposed. We may also dispense with the wear-plates and use two or more separating plates or rings, with the packing-rings inclosed between them, as shown in Fig. 18, the separating-plates being notched on their edges. A washer having radial grooves communicating with transverse peripheral grooves or with steam openings drilled through the washer admits the steam behind the packing-rings.

What we claim is—

1. In a rod-packing, one or more ring-chambers, each consisting of the two wear-plates inclosing the packing-ring and moving with the play of the rod, and two separating rings or plates, one behind each wear-plate, said rings or plates fitting the interior of the stuffing-box, and having central openings of a suitable diameter, substantially as described.

2. In a rod-packing, the combination, with a stuffing-box, of a washer resting against the cylinder-head, a wear-plate resting against the same, a cleft packing-ring resting against the wear-plate and inclosed on the other side by a similar wear-plate, a separator plate or ring having wings or circular flanges projecting from its opposite faces at or near its edge, which meets the wall of the stuffing-box, said wings or flanges meeting the washer on one side and a similar separating-plate on the other, the latter having wings or a flange upon its outer face only and a washer meeting the edge of said wings or flange, wear-plates being placed against the washer and the plate or ring to inclose a cleft packing-ring, substantially as described.

3. In a rod-packing, a series of ring-chambers composed of separating plates or rings meeting the wall of the stuffing-box and having passages for steam, each plate or ring having on opposite faces circular flanges, solid rings engaging said flanges and gaging the width of the chamber, and a series of cleft packing-rings arranged in said chambers and inclosed by wear-plates mounted on and moving with the cylinder, substantially as described.

4. In a rod-packing, the combination, with a series of ring-chambers separated by rings or plates and containing cleft packing-rings, of washers at each end of the series, a gland of slightly less diameter than the stuffing-box and having a slight or gradual taper and an outwardly-tapered ring, movable upon the gland and adjusted by bolts, substantially as described.

5. In a rod-packing, the combination, with a stuffing-box, packing-rings within the box, and a gland entering the box, of a tapering ring or annulus movable upon the exterior of the gland and having its tapered surface bearing against the interior of the box, and screw-bolts engaging the gland and the tapering ring or annulus to adjust the latter along the gland, substantially as and for the purpose described.

6. In a rod-packing, a ring or circular plate having a central opening for the rod and provided upon its opposite surfaces with wings or circular flanges adapted to engage solid rings which gage the width of the ring-chamber, substantially as described.

7. In a rod-packing composed of one or more ring-chambers, the combination of the stuffing-box of separating rings or plates centrally divided and provided with links by which they may be united, of wear-plates centrally divided and provided with links for uniting them and arranged on the rod on each side of the separating-plate, their lines of division crossing the line of division of the separating-plate at right angles, or nearly so, to form a steam-joint, substantially as described.

8. In a rod-packing, the combination, with a stuffing-box, of centrally-divided separated rings having links to unite the same and provided with circular flanges or wings on each face, of divided wear-plates laid against its opposite faces, the lines of division-breaking joints, divided rings engaging said flanges and having their equal parts united by a dove-tailed joint, and cleft packing-rings arranged within the chamber thus formed, substantially as described.

9. In a rod-packing, the combination, with a stuffing-box, of a divided separating ring or plate having recesses milled in its face near the line of division, and links engaging pins set in each recess to form flush surfaces, substantially as described.

In testimony whereof we have hereunto set our hands in presence of two subscribing witnesses.

FRANCIS P. MARTIN.
JOHN T. MARTIN.

Witnesses:
THOS. J. DOLLARD,
ANNA R. BOYD.